UNITED STATES PATENT OFFICE.

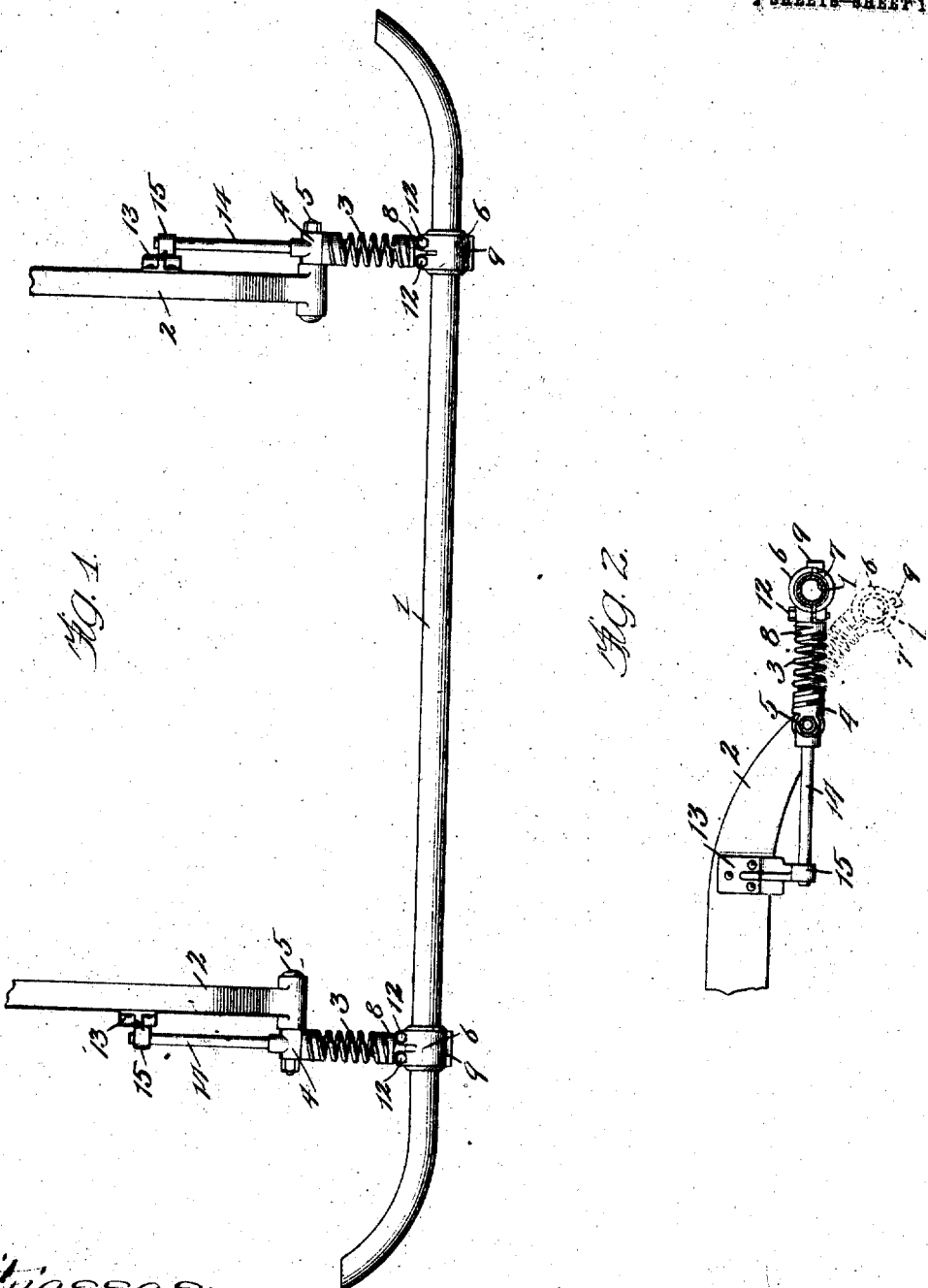

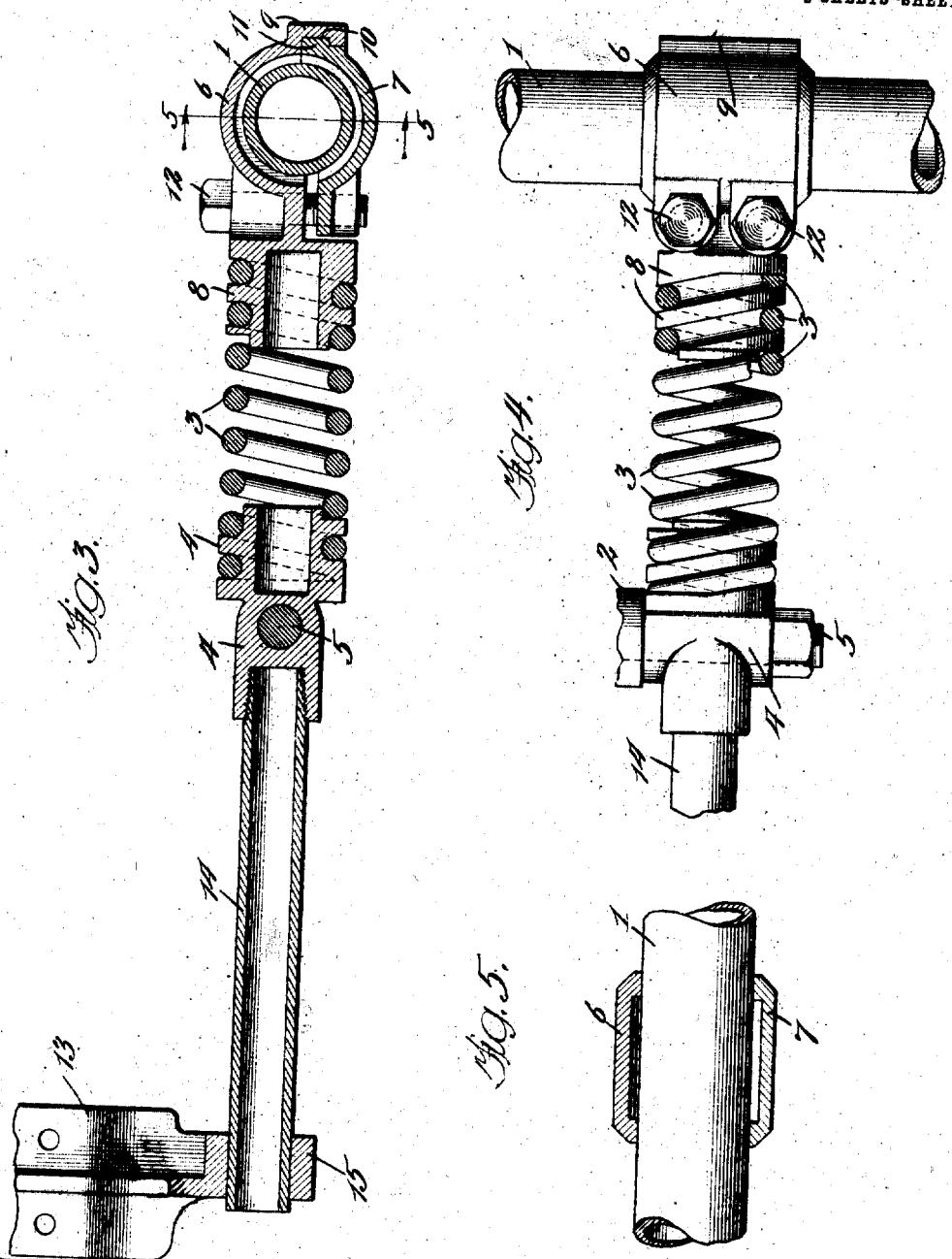

OSCAR A. ROSS, OF CHICAGO, ILLINOIS, ASSIGNOR OF ONE-HALF TO C. VALLETTE KASSON, OF CHICAGO, ILLINOIS.

FENDER.

995,371.  Specification of Letters Patent.  Patented June 13, 1911.

Application filed December 23, 1908. Serial No. 468,891.

*To all whom it may concern:*

Be it known that I, OSCAR A. ROSS, a citizen of the United States, residing at Chicago, in the county of Cook and State of Illinois, have invented certain new and useful Improvements in Fenders, of which the following is a description.

My invention belongs to that class of devices known as fenders and particularly a fender or bumper designed for use on automobiles or other vehicles, and more specifically relates to the means for securing and supporting the fender or fender rail upon the vehicle.

The objects of my invention are the production of a simple, efficient, attractive and inexpensive device of the kind described for use wherever applicable, and such a device as may be easily fitted to any car and when fitted may be readily attached or detached therefrom.

To this end my invention consists in the novel construction, arrangement and combination of parts herein shown and described and more particularly pointed out in the claims.

In the drawings, wherein like reference characters indicate like or corresponding parts, Figure 1 is a plan view of the fender rail and supporting means therefor, Fig. 2 is a side elevation of the rail support, Fig. 3 is a longitudinal vertical section of the same, Fig. 4 is a plan view of the same, and Fig. 5 is a vertical sectional view taken substantially on line 5—5 of Fig. 3.

Referring to the drawings, the fender or bumper comprises a rail 1 which is suitably supported from the vehicle frame 2 or other suitable part of the vehicle, preferably so as to permit the rail to absorb a shock from any forward direction or from a plurality of directions. In the construction shown, the supporting means comprises one or more resilient members 3 which are preferably secured to the vehicle frame 2 by means of brackets 4 or their equivalent. The brackets 4 may be secured to the vehicle frame by means of suitable bolts 5 or their equivalent for the purpose, and are preferably spirally grooved or threaded so that the resilient members 3 may be secured thereon by screwing the same into the grooves. Any suitable means may be employed to secure or lock the fender or rail 1 to the resilient supporting members 3, the preferred construction comprising a clamping member carried by each resilient member 3. The preferred form of clamping members comprises a plurality of interlocking or engaging parts 6 and 7, one of which parts is provided with a spirally grooved or threaded extension or part 8, adapted to be screwed on the resilient member 3, similar to bracket 4.

Referring particularly to Fig. 3, the part 6 of the clamping member is preferably extended as at 9 and provided with a recess 10 adapted to receive and coöperate with a tongue 11 on the member 7. One or more bolts 12, or their equivalent for the purpose, are employed to draw the parts 6 and 7 together and lock the clamp to the fender, or in the construction shown, to the rail 1. To retain the brackets 4 in operative position and prevent turning, thus permitting the rail or fender to drop below the desired position, should the brackets become loosened or the fender be of heavier construction than the rail 1 shown, I preferably provide brackets 13 carried by the vehicle and tubes or rods 14 connecting the brackets 4 and 13. As shown, the brackets 13 are secured to the frame 2 and are provided with collars 15 through which pass the tubes 14, or their equivalent, the opposite ends of the tubes being secured to the brackets 4. This construction rigidly retains the tubes and prevents turning of the brackets 4.

It is thus seen that in the preferred construction the fender is resiliently supported, the supporting means being preferably longitudinally resilient and transversely flexible (see Fig. 2) or resilient. The proportions of the various parts may be such as desired or found necessary. It might be mentioned that this construction takes the dead weight of the fender from the vehicle, which fact might be of very considerable importance where the rail 1 shown is replaced by a different construction having perhaps considerably more weight than rail 1.

Having thus described my invention, it is obvious that various immaterial modifications may be made in the construction, arrangement and combination of parts herein shown and described and more particularly pointed out in the claims, hence I do not wish to be understood as limiting myself to the exact construction or arrangement shown.

What I claim as new and desire to secure by Letters Patent is:

1. In a device of the kind described and in combination, a fender member and means for securing the same to a vehicle comprising a plurality of brackets carried by the vehicle, each provided with a circumferential groove therein, a coiled resilient supporting member for each of said brackets arranged thereon in said groove and means for securing said coiled members to the fender, said means comprising rail clamping members each comprising two members engaging with a tongue and groove connection at one side thereof and provided with means at substantially the opposite side for drawing and securing said parts together and with a circumferential groove for said coiled member.

2. An automobile fender comprising an impact bar and arms carrying said bar at their forward ends, each of said arms comprising a portion secured to the car, a bearing in which said bar is adjustably mounted, and a coiled spring interposed between and secured to said portion and said bearing, the coils of said spring closing or becoming tighter by pressure caused by the impact of said bar with an obstruction.

In testimony whereof, I have hereunto signed my name in the presence of two subscribing witnesses.

OSCAR A. ROSS.

Witnesses:
BURTON U. HILLS,
CHARLES I. COBB.